United States Patent [19]

Shellhause

[11] Patent Number: 5,022,502
[45] Date of Patent: Jun. 11, 1991

[54] TEE ANCHOR FOR DUO SERVO DRUM BRAKES

[75] Inventor: Ronald L. Shellhause, Vandalia, Ohio

[73] Assignee: General Motors Corporation, Detroit, Mich.

[21] Appl. No.: 375,322

[22] Filed: Jul. 3, 1989

[51] Int. Cl.$^5$ ............................................. F16D 51/52
[52] U.S. Cl. .................................... 188/333; 188/341; 192/75
[58] Field of Search ............... 188/341, 331, 332, 333, 188/336, 339; 192/25

[56] References Cited

U.S. PATENT DOCUMENTS

| 2,140,741 | 12/1938 | Goepfrich | 188/331 |
| 2,755,889 | 7/1956 | Schnell | 188/341 |
| 3,273,677 | 9/1966 | Press | 188/341 |

FOREIGN PATENT DOCUMENTS

| 945611 | 9/1956 | Fed. Rep. of Germany | 188/341 |
| 1000246 | 1/1957 | Fed. Rep. of Germany | 188/341 |
| 1256408 | 2/1961 | France | 188/331 |

Primary Examiner—George E. A. Halvosa
Attorney, Agent, or Firm—Ernest E. Helms

[57] ABSTRACT

A duo servo drum brake shoe anchor having a T-shaped configuration in which the inner recess corner surfaces define a pocket on each side, each of which receives a rounded end of one of the shoes in force transmittable engagement. The crossbar part of the anchor is located on one end of the keystone-shaped main body part of the anchor. The main body part has slanted sides which contract the tendency of the secondary shoe end, for example when forward braking is in process, to move outwardly in a wedging action, and the crossbar part lower sides forming part of the pockets prevent the shoe end in the pocket from moving outwardly toward the drum being braked.

7 Claims, 1 Drawing Sheet

TEE ANCHOR FOR DUO SERVO DRUM BRAKES

FIELD OF THE INVENTION

The invention is concerned with drum brakes of the duo servo type, and particularly with the brake shoe anchor and its relationship to the brake shoe assemblies.

BACKGROUND OF THE INVENTION

Drum brakes of the duo servo type are designed to obtain a servo action by means of a wheel cylinder or similar device action on the brake shoes at or near one adjacent pair of shoe ends. They are also designed to obtain additional mechanical servo action once the brake shoes have been moved into engagement with the brake drum friction braking surface by the wheel cylinder. The primary brake shoe, having engaged the drum friction braking surface with the drum rotating, is forced by rotating action of the drum to move arcuately in the direction of drum rotation. The other end of the primary brake shoe from the wheel cylinder acts through the adjuster strut to push on the adjacent other end of the secondary brake shoe, urging the secondary brake shoe arcuately and also outwardly toward the drum friction braking surface with greater total braking force then being exerted on the secondary brake shoe than is obtained by the wheel cylinder acting alone on the that shoe. This provides a multiplication of the brake actuating force caused by the direct action of the wheel cylinder alone, causing the braking action of the brake to increase at a faster rate than a straight-line increase with the increase in wheel cylinder brake apply force. The brake shoe ends at or near where the wheel cylinder is located often have an anchor which serves as a brake shoe end positioning stop when the brakes are not activated, the brake shoes being retracted to this position by retraction springs continually urging the one adjacent pair of shoe ends toward engagement with the anchor. The anchor also transfers the brake forces tending to rotate the brake shoes from the shoes to the backing plate and then to a fixed part of the vehicle.

In recent years it has become more common to provide disc brakes for the front wheels of a vehicle and drum brakes for the vehicle rear wheels. Also, it has become more common to use front wheel drive vehicles, in which the dynamic weight shift during braking loads the front wheel brakes considerably more than the rear wheel brakes. Since the rear wheel brakes do not have as heavy a demand for braking under these circumstances, the rear wheel brakes have either been changed to the leading-trailing type or, if duo servo brakes, a pressure proportioner has been used to proportionately decrease the brake actuating pressure to the rear brakes in relation to the front brakes. This has been desirable because the disc brakes are 1:1 straight-line function brakes in that their braking effort is directly proportional to the actuating pressure being applied to them, while duo servo brakes increase their braking effort at a higher rate than 1:1 as the actuating pressure to them increases. Proportioners prevent unwanted high duo servo drum brake outputs.

However, in braking a forward moving vehicle, which is the usual case, the secondary brake shoe end engaging the brake shoe anchor tends to try to wedge itself between the anchor and the brake drum, riding up on the anchor away from the center of rotation of the drum as it does so. When this occurs, the drum brake output becomes somewhat more erratic and also is higher due to the increased mechanical servo action. The shoe then wears faster, heats up more with a consequent reduction in fade resistance, and brake noises increase. While not all of these results occur in well-designed duo servo brakes, the possibility of any of them occurring should be obviated or diminished substantially if possible.

SUMMARY OF THE INVENTION

A brake shoe anchor having a "T" configuration, with the crossbar of the T extending outwardly from the top of a keystone shaped main body portion, has been found to overcome the likelihood that any of the above noted possibilities will occur. The keystone portion is provided with slanting sides lying in planes that, when continued to the center of rotation of the brake drum, intersect before they reach that center of rotation. The ends of the brake shoes are preferably rounded so that each shoe end normally contacts the anchor at two points. One point is on the ledge formed by the T crossbar, and the other is on the side surface of the keystone portion. If a radius line is drawn from each juncture of the crossbar with the slanting side surfaces of the keystone portion, it should relate to the plane in which that keystone side surface lies at an angle within the range of about 1° to as high as about 15°. The precise angle depends at least in part on the coefficient of friction between the anchor and the shoe end and also the angle at which the effective force vector of the shoe force is acting on the anchor. When the mechanical servo action force of the primary brake shoe is applied to the secondary brake shoe, concurrently with the action of the wheel cylinder urging the end of that brake shoe outwardly toward the brake drum, the end of the secondary brake shoe will tend to ride radially outward on the anchor with the usual anchor construction. In the construction embodying the invention, the ledge on the crossbar engaged by the brake shoe end, and the slant of the keystone portion side surface also engaged by the brake shoe end, will act to keep the secondary brake shoe end in proper position, with no tendency to increase the duo servo brake output at a still higher rate. When the drum runout at its shortest running radius impinges on the secondary shoe, the shoe just moves slightly inward toward the axis of rotation of the drum without substantial restriction due to the slant angle of the keystone portion side surface, at the same time allowing the shoe to pivot as needed for its normal braking action. It will therefore not cause the lining to wear at a faster rate in the area of that end of the shoe, nor will that end of the shoe become hotter faster. This increases the brake's resistance to fade. It will also result in better parking brake output when the drum brake is the one also mechanically actuated for parking, and will have less noise increase than the brake in which the shoe tries to ride outward on the anchor under these circumstances. It also counteracts the outward vector resultant of the retractor spring as it acts on the secondary brake shoe. By providing the same construction for the end of the primary brake shoe as well, it functions in the same manner when the vehicle is being braked while backing up. In each of these instances, a more stabilized brake output is obtained, giving the brake a much tighter performance range throughout its life.

DETAILED DESCRIPTION OF THE DRAWING

Figure 1:
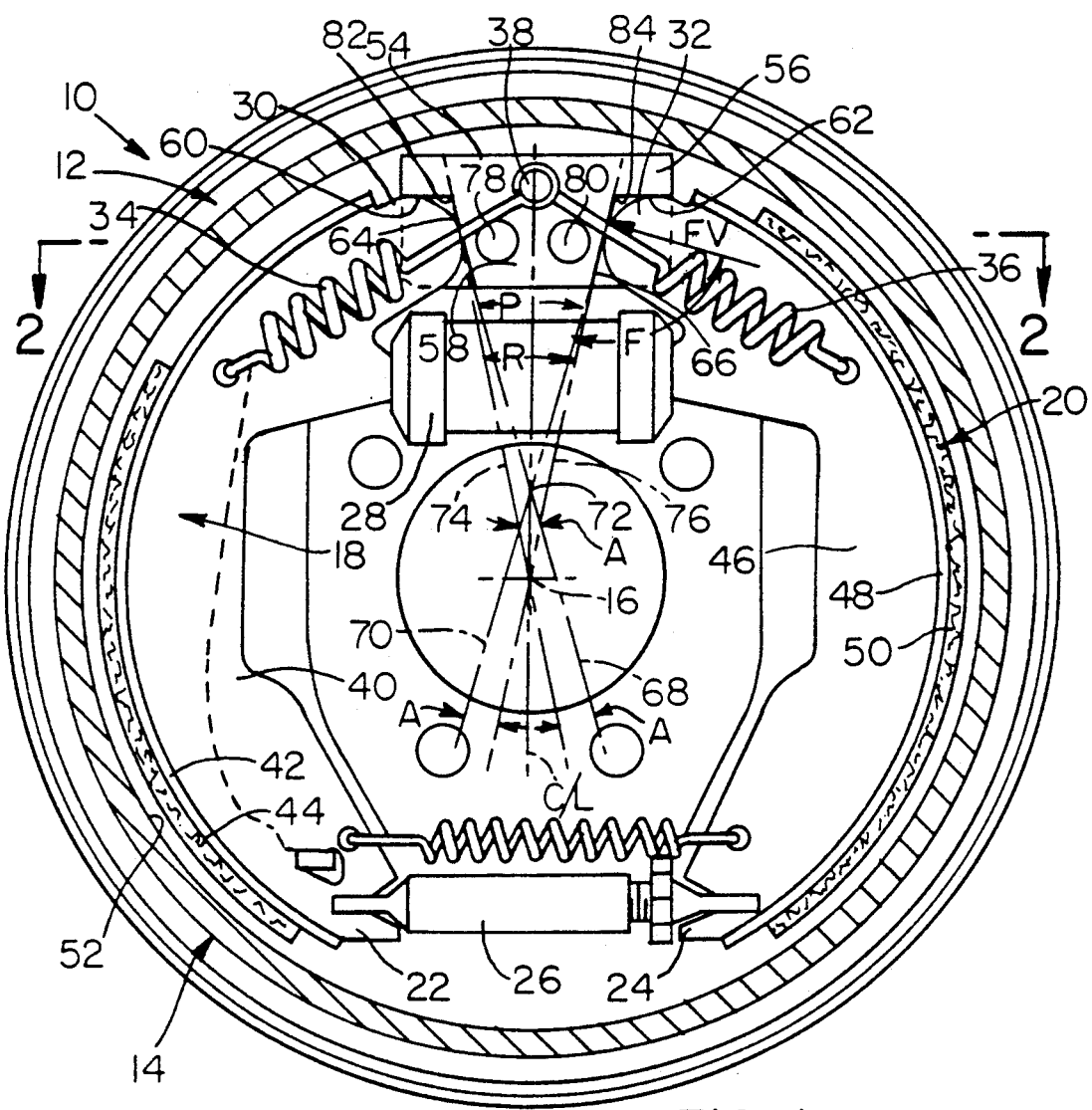
FIG. 1 is a cross section view of a duo servo drum brake embodying the invention. The brake is shown in the released position.

The duo servo brake assembly 10 in the drawing includes a typical backing plate 12 secured to a fixed part of the vehicle to be braked, a brake drum 14 rotatable about its axis 16 when the vehicle is moving, a primary brake shoe assembly 18 and a secondary brake shoe assembly 20 connected at their adjacent ends 22 and 24 by the brake adjuster strut 26, a wheel cylinder 28 near their other adjacent ends 30 and 32, and a pair of brake shoe retraction springs 34 and 36 having their adjacent ends secured about the anchor pin 38 and their other ends secured to the respective primary and secondary brake shoe assemblies. The primary brake shoe assembly 18 includes a shoe web 40, a shoe rim 42 and a friction brake lining 44 secured to the shoe rim. The secondary brake shoe assembly 20 includes a shoe web 46, a shoe rim 48 and a friction brake lining 50 secured to the shoe rim. The brake linings 48 and 50 are positioned to engage the friction braking surface 52 of the brake drum 14 when the wheel cylinder is pressurized by brake fluid. Parts of a typical brake assembly which do not directly relate to the disclosure of the invention have been omitted for simplicity in the drawing. Such parts include the parking brake mechanism which is typically a part of a vehicle rear wheel drum brake, shoe hold-down springs, and automatic brake adjusting mechanism.

The brake shoe ends 30 and 32 are preferably generally rounded, and are held in exclusive two parallel line engagement with the shoe anchor 54 by the retracting forces of springs 34 and 36 when the brake is in its released condition shown. The anchor 54 is formed as a T as seen in FIG. 1, with a crossbar section 56 and a keystone body section 58 extending inwardly of the brake assembly from the crossbar section. The crossbar section 56 is arranged to be substantially perpendicular to the centerline CL of the anchor. That centerline lies on a radius of the drum when the anchor is secured in position. The crossbar section 56 and the keystone body section 58 are preferably formed symmetrically about the anchor centerline CL. The lower edge surfaces 60 and 62 of the crossbar section 56 are located on either side of the outward part of the keystone body section 58 and join with the opposite side edge surfaces 64 and 66 of the keystone section at the apexes of the included obtuse angles formed by the joining surfaces. The joined surfaces form anchor pockets or recesses in which the shoe ends 30 and 32 are respectively received.

The lower surfaces 60 and 62 define ledges that preferably lie substantially on a chord of the brake drum, while the keystone side surfaces 64 and 66 respectively lie in intersecting planes 68 and 70. These planes intersect at 72, that intersection being located between the drum axis 16 and the anchor 54. When radii 74 and 76 are drawn from axis 16 to the juncture 82 of surface 60 with surface 64 and to the juncture 84 of surface 62 with surface 66, they each form an angle A with the planes 68 and 70, respectively. The included angle P of intersection of planes 68 and 70 is greater than the included angle of intersection R of the radii 74 and 76. In some instances one angle A may have a different degree value than the other angle A. However, it is generally preferred that both of the angles A be have the same degree value. It has been found that the angle A should usually be in the range of about 1° to 4°, but in some instances may possibly be as much as about 15°. At any of the values of A in this range, the side surfaces 64 and 66 form a slant side of each of the keystone portion side surfaces 64 and 66. The slant side arrangement tends to guide the shoe ends 30 and 32 inwardly rather than outwardly. The value of angle A which is selected depends upon several factors including the materials of which the anchor and the shoe ends are made, the coefficient of friction between those materials at the particular angle of engagement, and the angle at which the effective force vector FV of the shoe force is acting on the anchor. For best results, the angle F between that force vector and the portion of the side surface 64 or 66 extending toward the axis of rotation of the drum should be greater than 90°.

Figure 2:
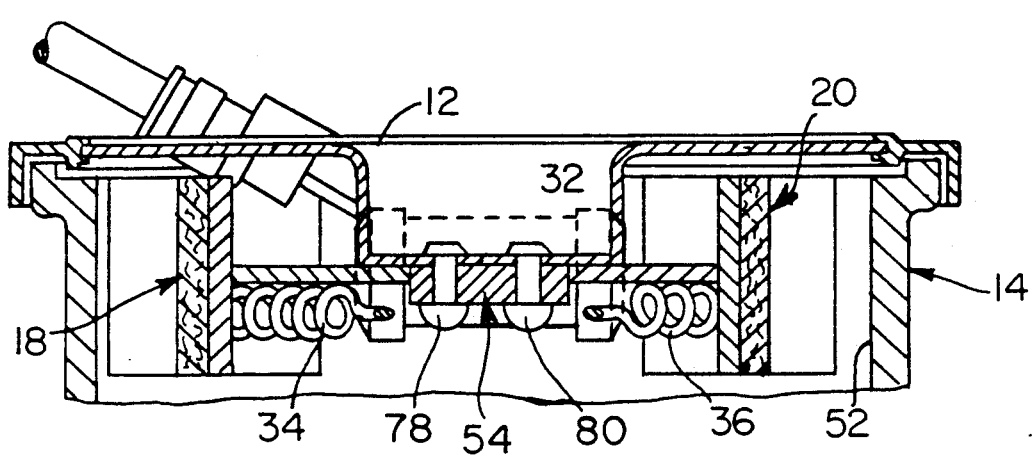
FIG. 2 is a cross section view taken in the direction of arrows 2—2 of FIG. 1.

The anchor 54 is suitably secured to the backing plate by fastening means such as rivets 78 and 80. Furthermore, anchor pin 38 is fastened through the anchor to the backing plate and also to a pin support, not shown because of the location of the section taken to provide FIG. 2. As is well known, the pin support may be a fixed part of the vehicle, such as a knuckle.

When the vehicle on which the brake is installed has forward motion, the drum rotates counter-clockwise as seen in the drawing. When the brake is actuated, pressurized brake fluid is introduced into the wheel cylinder 28. The wheel cylinder pistons are moved outward, moving the brake shoe ends 30 and 32 away from the anchor surfaces 64 and 66 while sliding along the ledges formed by surfaces 60 and 62 of the T crossbar section 56. The shoes therefore tend to pivot about the ends of the adjuster strut 26 until they engage the friction braking surface 52 of drum 14. The torque then exerted on primary brake shoe 18 moves that shoe slightly counter-clockwise, exerting a mechanical force through the adjuster strut 26 to shoe end 24 of shoe 20 and forcing the secondary shoe toward full surface friction braking engagement with the drum. This causes shoe 20 to be forced counterclockwise, reengaging shoe end 32 with the surface 66 of the anchor 54 and adding to the braking force being exerted on the secondary shoe. Although the mechanical servo force acting through the adjuster strut continues to urge the shoe 20 counter-clockwise, as does the torque of the brake drum while it is still rotating, the anchor ledge 62 will not permit the shoe end to slide outwardly on surface 66. Due to the angle A, and particularly at higher values of that angle, there may even be a slight component of force urging the shoe end 32 inward. Whether or not that occurs, it can be seen that the effective length of the shoe's action on the drum cannot be increased, nor can a wedging action occur as the shoe end 32 tries to move further counter-clockwise. Therefore a more consistent braking effort is obtained without decreasing lining wear. Fade resistance is maintained because there is not a much higher brake loading at the lining end near shoe end 32, and a lower noise level is attainable.

The embodiments of the invention in which an exclusive property or privilege is claimed are defined as follows:

1. In a dual servo drum brake having a rotatable drum to be braked, said drum having an axis of rotation, said brake also having a primary and a secondary brake shoe assembly, a brake shoe anchor for one pair of adjacent ends of said brake shoe assemblies, means when actuated moving said brake shoe assemblies into engagement with said drum, and brake shoe retractor springs for retracting said brake shoe assemblies when said moving means is released and continually urging said brake shoe ends toward engagement with said anchor, the improvement comprising:

said brake shoe anchor being T-shaped with a keystone body section and a crossbar section extending across and laterally beyond one end of said keystone body section, said keystone body section having opposite first and second side surfaces and said crossbar section having first and second side ledge surfaces joining with said opposite side surfaces and extending laterally therefrom, said first and second side ledge surfaces and said first and second opposite side surfaces respectively cooperating to form a first anchor pocket with said first surfaces and a second anchor pocket with said second surfaces, said primary and secondary brake shoe assemblies respectively having a primary shoe end and a secondary shoe end, each of said shoe ends being formed to provide an edge surface, said edge surfaces of said primary shoe end and said secondary shoe end respectively being in force transmittable exclusive two parallel line contact with said surfaces defining said first and second anchor pockets with the brake assembly in its released position, one of said shoe ends being generally rounded and continuing in said exclusive two parallel line force transmittable contact when the brake assembly is applied and is transmitting brake force from said one shoe end to said anchor, said side ledge in contact with said one shoe end preventing said one shoe end from moving outwardly toward said drum, and said keystone body side surface, which is in contact with said shoe end receiving brake force from said one shoe end, receiving said brake force at such an angle thereto as to encourage movement of said one shoe end inwardly of said brake shoe assembly towards the center of rotation of said drum without substantial restriction.

2. The brake shoe assembly of claim 1, said crossbar ledge surfaces being located substantially on a chord of said drum.

3. The brake shoe assembly of claim 1 in which said first and second keystone body opposite side surfaces respectively lie in first and second intersecting planes, the intersection of said planes being between said anchor and the axis of rotation of said drum.

4. The brake shoe assembly of claim 3, said crossbar ledge surfaces being located substantially on a chord of said drum.

5. The brake shoe assembly of claim 3 in which first and second radii, extending from the axis of rotation of said drum and each passing through one of the junctures of said ledge side surfaces and said keystone body opposed side surfaces, and said first and second planes respectively have first and second angles therebetween formed respectively by said first radius and said first plane and by said second radius and said second plane, said first and second angles each being in the range of about 1° to 15°.

6. The brake shoe assembly of claim 5, said first and second angles having equal angular degree values.

7. The brake shoe assembly of claim 5, said crossbar ledge surfaces being located substantially on a chord of said drum.

* * * * *